United States Patent [19]

Blaschke

[11] 4,019,814
[45] Apr. 26, 1977

[54] DEVICE FOR USE ON A FILM PROJECTOR FOR COPYING FILMS

[75] Inventor: Ludwig Blaschke, Munich, Germany

[73] Assignee: Braun Aktiengesellschaft, Kronberg, Taunus, Germany

[22] Filed: Nov. 5, 1973

[21] Appl. No.: 412,648

[30] Foreign Application Priority Data

Nov. 7, 1972 Germany .................... 2254445

[52] U.S. Cl. .................... 352/169; 352/137; 352/121
[51] Int. Cl.² .................... G03B 21/38
[58] Field of Search ......... 352/169, 137, 121, 129, 352/47, 89

[56] References Cited
UNITED STATES PATENTS

| 2,011,353 | 8/1935 | Capstaff | 352/89 X |
| 2,310,339 | 2/1943 | Arndt | 352/89 X |

FOREIGN PATENTS OR APPLICATIONS

| 853,980 | 4/1940 | France | 352/89 |
| 239,964 | 11/1945 | Switzerland | 352/89 |

*Primary Examiner*—Monroe H. Hayes
*Attorney, Agent, or Firm*—Ernest F. Marmorek

[57] ABSTRACT

A device on a film projector for copying movie films in combination with a movie camera which is equipped with a releaser for the exposure of single frames. Said device includes a speed-changing mechanism at the film projector for changing the speed of projection to less than the maximum exposure rate of the movie camera when operating the single-frame releaser. The film projector further comprises a pulse-generating switch, which is operated synchronously with the film feed mechanism of the film projector, such that a pulse is generated or transmitted at each change of frame of the projected film. Said pulses are used for releasing the single-frame releaser of the movie camera.

3 Claims, 5 Drawing Figures

DEVICE FOR USE ON A FILM PROJECTOR FOR COPYING FILMS

BACKGROUND OF THE INVENTION

This invention relates generally to a device for use on a film projector for copying films by means of a movie camera equipped with a single-frame releaser.

A number of devices for copying cinematographic films are already known which generally comprise a projection unit and a photographic unit, which are assembled at the correct distance apart for projection purposes. Such devices include a photographic chamber, which may be sealed against the entry of light and in which the copy film is inserted. The individual frames of the original film to be copied are projected. Copying devices of such a type are specially designed units and can only be used for this specific purpose.

It is accordingly an object of the present invention to provide a device for use on a film projector of the usual type of construction so that it can be used together with a movie camera equipped with a single-frame releaser.

SUMMARY OF THE INVENTION

In accordance with the present invention this is achieved by a speed-changing mechanism for changing the speed of projection of the film projector to less than 8 frames per second, a pulse-generating switch, which is adapted to operate synchronously with the film advance mechanism of the film projector, and means for transmitting the generated pulses to the movie camera to release single-frame exposure thereof. When the movie camera is directed to the screen, on which the original film is projected, said film may be copied. The speed of projection must of course be chosen at least slightly lower than the maximum frame sequence time of the movie camera during single-frame exposure.

The speed-changing mechanism preferably includes a cut-off switch which disconnects the pulse-generating switch from the transmitting means at normal projection speeds, which usually range from 16 to 25 frames per second. This prevents mal-function by copying at too high a frame speed at which, due to the inertia of the single-frame switching means of the camera, correct copies cannot be made. The speed changing mechanism is preferably adapted to reduce the speed of projection to about 5 frames per second. Such a projection speed is somewhat lower than the maximum photographying speed during single-frame exposure of a movie camera. The speed of projection may be variable for adapting it to the speed of the movie camera.

Bearing in mind that, with many types of movie cameras, a different period of time elapses between operating the single-frame releaser on the one hand and exposure on the other hand, the moment of operating the pulse-generating switch may be adjustable to relate to the film feed of the film projector. The pulse-generating switch may be a contact maker which is controlled by the revolving shutter of the film projector. The position of the contact maker may be adjustable.

An auxiliary switch, controllable by markings on the film to be copied, may be provided for switching the transmitting means on and off. This enables copying of specific scenes or sections of a film.

DESCRIPTION OF A PREFERRED EMBODIMENT

Figure 1:
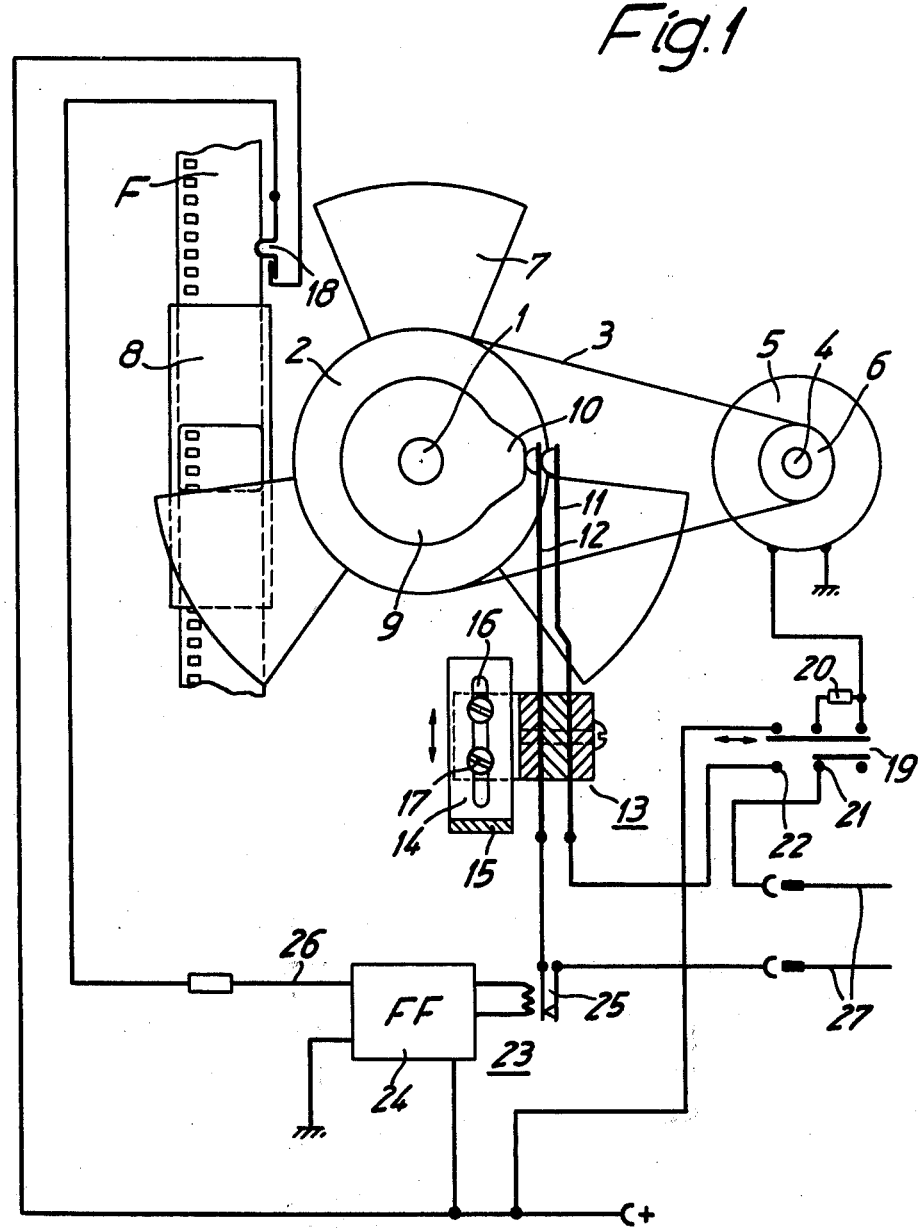
FIG. 1 is a schematic view of a film projector equipped with a device according to the invention.

FIG. 1 shows those parts of a film projector which are necessary for understanding of the device according to the invention. The film projector includes a shaft 1 on which is secured a pulley 2 which is connected to pulley 6 of a smaller diameter, fitted on the output shaft 4 of an electric motor 5, by a rubber belt 3. Shaft 1 also carries a three-bladed shutter 7 which moves in front of a film channel 8, through which a film is movable in the usual way by a claw mechanism (not shown). Shaft 1 further carries a cam disc 9, which is provided with a lobe 10, in the path of which contact elements 11 and 12 of a contact maker 13 are arranged. Shaft 1 is coupled to the driving mechanism for the film F such that the bladed shutter 7 makes one revolution per frame feed. The contact maker 13 is attached to a slidable retaining part 14 which may be adjusted by a protrusion 15 a certain distance in the direction of the double arrow to adjust the precise moment of operation of the contact maker. Retaining part 14 has a slot 16 which receives two retaining screws 17 spaced from one another by a distance less than the length of slot 16. An auxiliary switch 18 which lies adjacent one edge of the film F has contacts which are closed as soon as a recess in the film passes the switch.

A speed-changing mechanism 19 is also provided by means of which the speed of projection of the film projector can be converted either to a usual value of about 18 frames per second or to a lower value of about 5 frames per second. At said reduced speed of projection, speed-changing, speed-changing mechanism opens contacts bridging a resistor 20 in the supply line of the electric motor 5 and at the same time interconnects contacts 21 and 22 which are in series with contact spring 12. The input 26 of the bi-stable flip-flop 24 is connected via auxiliary switch 18 to a supply line to the electric motor 5.

The device operates in the following manner. During normal operation of the film projector, i.e., when showing a film, the speed-changing mechanism 19 is in the position illustrated in FIG. 1 in which resistor 20 is short-circuited and the full supply voltage is led to electric motor 5. Contacts 21 and 22 are opened, and pulses generated by the contact making of contact maker 13 are not transmitted to a twostrand cable 27 leading to the movie camera's release means. At this normal speed of projection, therefore, the movie camera is not acutated. Thus, if an attempt is made to copy a film with this high frame speed, no film is wasted in the movie camera.

For copying a film, speed-changing mechanism 19 is switched over, i.e. it is shifted to the left as viewed in FIG. 1. Therefore, resistor 20 is inserted in the supply line of electric motor 5 and the latter turns at a reduced speed, which should correspond to a frame speed of the film projector of between 4 and 6 frames per second. Such a frame speed is low enough to enable photographing the projected frames with single-frame switching of the movie camera whilst, on the other hand, it is high enough to prevent burning of the film if the heat-absorbing filter has not been switched on. Contacts 21 and 22 of the speed-changing mechanism are closed, and pulses generated as a result of contact making of contact maker 13 are transmitted to the connecting cable 27 for as long as the operating relay 25 is closed.

Figure 2A:
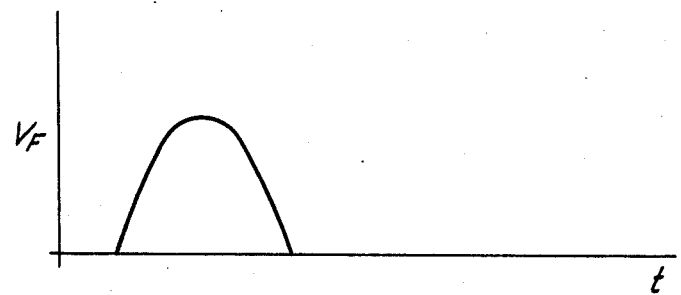
FIGS. 2a, 2b, 2c and 2d are graphical representations of the operations of various parts of a film projector plotted versus time.
Figure 2B:
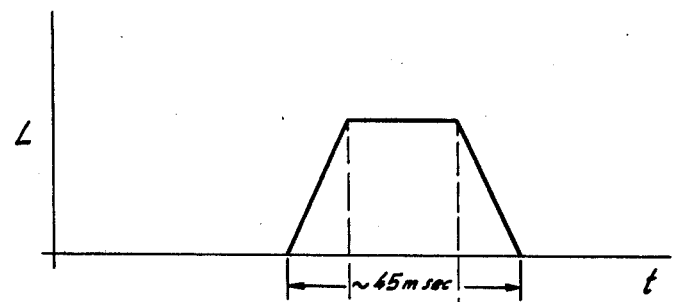

Contact maker 13 is arranged with respect to lobe 10 of the cam that the exposure time of a single frame of the movie camera falls within the projection time of a frame of the film to be copied. The various time relationships will be discussed in detail with reference to the graphical representations of FIG. 2. FIG. 2a shows the film speed $V_F$ plotted versus time at the film projector, and FIG. 2b shows the luminous flux L of the film projector. Exposure of the frame visually occurs, as is evident from comparison with FIG. 2a, after completion of the film feed.

Figure 2C:
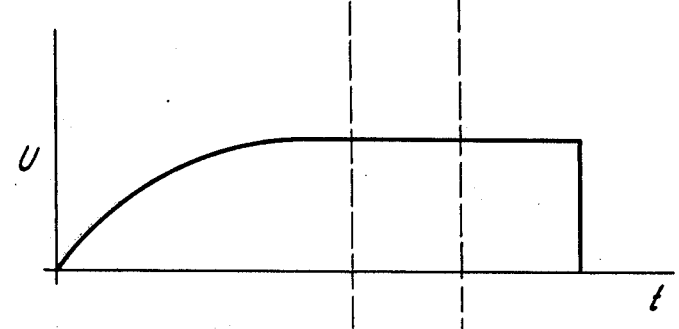
Figure 2D:
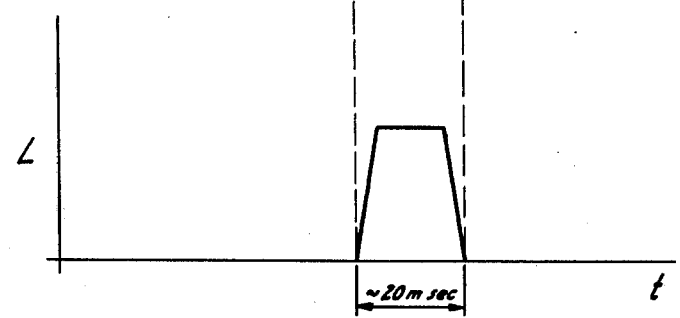

FIG. 2c shows the speed U of the driving motor plotted versus time from commencement of the release of the single frame releaser until the camera stops, and FIG. 2d shows the exposure of the film in the single-frame mode of operation. The moment of release of the movie camera in relation to the commencement of exposure at the film projector (FIG. 2b) is delayed such that the exposure of the copy film lies within the period of exposures of the film projector. Since various types of movie cameras have different time lags between operation of the single-frame release means and the commencement of exposure, an adjustment may be made by means of protrusion 15, so that during single-frame exposure of the movie camera exposure always takes place at an optimum phase relationship to the film feed of the projector.

A device according to the invention can be used both in film projectors with a single-blade shutter and in those with a multi-blade shutter and the exposure need not be restricted to one gap of the shutter. The insertion of a heat-absorbing filter is optional.

What is claimed is:

1. A device for use in cooperation with a film projector for photographing a film projection with a movie camera equipped with a single-frame releaser operable from a signal, said device comprising a speed-changing means operable for changing the speed of projection of said film projector to less than 8 framer per second, a pulse-generating means operable for producing a pulse signal synchronously with the film feed of said film projector, coupling means for coupling said pulse signal to said movie camera to cause release of a single-frame exposure thereof, and phase variable means for adjusting the phase relationship of operation of said pulse-generating means with respect to the film feed of said film projector, whereby synchronization between said pulse-generating means and the film feed, can be optimized.

2. A device for use in cooperation with a film projector for photographing a film projection with a movie camera equipped with a single-frame releaser operable from a signal, said device comprising a speed-changing means operable for changing the speed of projection of said film projector to less than 8 framer per second, a pulse-generating means operable for producing a pulse signal synchronously with the film feed of said film projector, and coupling means for coupling said pulse signal to said movie camera to cause release of a single-frame exposure thereof said pulse-generating means comprising a contact maker operable by a revolving shutter of said film projector.

3. The device as claimed in claim 2, further comprising position means for adjusting the operating position of said contact maker.

* * * * *